US008606655B2

(12) United States Patent
Allen et al.

(10) Patent No.: US 8,606,655 B2
(45) Date of Patent: Dec. 10, 2013

(54) METHODS AND APPARATUS FOR MANAGING A UNIVERSAL LIST SYSTEM

(75) Inventors: Geoffrey Benjamin Allen, Potomac Falls, VA (US); Steven Lee Geyer, Herndon, VA (US); Bradley Spector Herrup, Arlington, VA (US); Rodney Dale McElrath, Raleigh, NC (US); Timothy Scott Ramsey, Chantilly, VA (US)

(73) Assignee: Ziplist, Inc., Sterling, VA (US)

( * ) Notice: Subject to any disclaimer, the term of this patent is extended or adjusted under 35 U.S.C. 154(b) by 144 days.

(21) Appl. No.: 13/233,388

(22) Filed: Sep. 15, 2011

(65) Prior Publication Data

US 2013/0073423 A1 Mar. 21, 2013

(51) Int. Cl.
*G06Q 30/00* (2012.01)

(52) U.S. Cl.
USPC ............ 705/26.8; 705/1; 705/26.1; 705/26.2; 705/44; 707/104.1; 707/736; 707/999.107; 707/803

(58) Field of Classification Search
USPC ............ 705/26.1, 26.2, 26.8, 44, 1; 707/736, 707/999.107, 803, 104.1
See application file for complete search history.

(56) References Cited

U.S. PATENT DOCUMENTS

| | | | |
|---|---|---|---|
| 6,298,330 B1 | 10/2001 | Gardenswartz et al. | |
| 2001/0049624 A1 | 12/2001 | Uyama et al. | |
| 2005/0273817 A1* | 12/2005 | Rodriguez et al. | 725/46 |
| 2006/0041478 A1 | 2/2006 | Zheng | |
| 2007/0108275 A1* | 5/2007 | Shuster | 235/383 |
| 2008/0005168 A1* | 1/2008 | Huff et al. | 707/104.1 |
| 2008/0228600 A1 | 9/2008 | Treyz et al. | |
| 2008/0270233 A1 | 10/2008 | Yip et al. | |
| 2008/0312950 A1* | 12/2008 | Testa et al. | 705/1 |
| 2009/0037288 A1 | 2/2009 | Christensen | |
| 2010/0121710 A1 | 5/2010 | Chipman et al. | |
| 2010/0125500 A1 | 5/2010 | Beavers et al. | |
| 2010/0138416 A1* | 6/2010 | Bellotti | 707/736 |

(Continued)

FOREIGN PATENT DOCUMENTS

WO    WO 00/77667    12/2000

OTHER PUBLICATIONS

Ziplist Press, "Ziplist Launches Free Online Shopping List Services to Simplify Meal Planning and Grocery Shopping," Feb. 16, 2010, http://www.ziplist.com/press_release/20100216.

(Continued)

*Primary Examiner* — Yogesh C Garg
(74) *Attorney, Agent, or Firm* — Cooley LLP

(57) ABSTRACT

In some embodiments, a non-transitory processor-readable medium includes code to cause a processor to receive, via a first communication mode, a first indicator associated with a first user-performed process, and receive, via a second communication mode different from the first communication mode, a second indicator associated with a second user-performed process. The code includes code to cause the processor to identify, using the first indicator a first set of items for the first user-performed process, and identify, using the second indicator, a second set of items for the second user-performed process. The code further includes code to cause the processor to define a vendor-agnostic list to include the first set of items and the second set of items, and send a signal associated with at least a portion of the vendor-agnostic list to a communication device.

25 Claims, 7 Drawing Sheets

(56) References Cited

U.S. PATENT DOCUMENTS

| | | |
|---|---|---|
| 2011/0029370 A1 | 2/2011 | Roeding et al. |
| 2011/0082765 A1 | 4/2011 | Mazor |
| 2013/0073392 A1 | 3/2013 | Allen et al. |

OTHER PUBLICATIONS

ZipList Press, "ZipList Releases Free Shopping List and Recipe App for iPhone, iPod Touch & iPad Users," Apr. 20, 2010, http://ziplist.com/press_release/20100420.

OurGroceries—Features, retrieved from the Internet Sep. 14, 2010, http://www.ourgroceries.com/features.

Lifehacker, "ZipList Is an Impressive Grocery List Tool with Coordinated Shopping, Anywhere Access," Feb. 25, 2010, http://lifehacker.com/5479742/ziplist-is-an-impressive-grocery-list-tool-with-coordinated-shopping-anywhere-access.

Lifehacker, "Manage your life via SMS," Jul. 27, 2007, http://lifehacker.com/281793/manage-your-life-via-sms.

International Search Report and Written Opinion mailed Nov. 20, 2012 for PCT Application No. PCT/US12/55428.

International Search Report and Written Opinion mailed Nov. 20, 2012 for PCT Application No. PCT/US12/55439.

\* cited by examiner

Process Database 300

| Process ID 310 | Process Name 320 | Items Involved 330 |
|---|---|---|
| 1 | Painting a Room | Paint |
| | | Tarp |
| | | Paint Brushes |
| | | Paint Roller |
| 2 | BBQ Chicken | BBQ Sauce |
| | | Chicken Breasts |
| 3 | Pasta Sauce | Canned Tomato Sauce |
| | | Ground Beef |
| | | Salt |
| | | Dried Basil |
| | | Olive Oil |
| | | Onion |
| N | Name$_M$ | Item$_T$ |

FIG. 3

User Database 400

| User ID 410 | Telephone Number 420 | Email Address 430 | IM ID 440 |
|---|---|---|---|
| Cool1 | (200) 877-3309 | Cool1@isp1.com | Cool |
| Hut20 | (123) 456-7890 | H4@isp2.com | hut1 |
| Sid6 | (238) 557-7155 | did7@isp3.com | --- |
| Hop45 | ----- | hit@isp4.com | foo |
| A | B | C | D |

FIG. 4A

| Universal List Database 450 ||
|---|---|
| User ID 460 | Item 470 |
| Cool1 | Skim Milk |
| Hut20 | BBQ Sauce |
| | Chicken Breasts |
| Hop45 | Paint |
| | Tarp |
| | Paint Brushes |
| | Paint Roller |
| ... | ... |
| N | $Name_M$ |

FIG. 4B

METHODS AND APPARATUS FOR MANAGING A UNIVERSAL LIST SYSTEM

CROSS-REFERENCE TO RELATED APPLICATIONS

This application is related to U.S. patent application Ser. No. 13/233,396, filed Sep. 15, 2011, now published as U.S. Patent Application Publication No. 2013/0073392 A1 and entitled "Methods and Apparatus for Obtaining Off-Line Purchase Information in Response to Multimedia Advertising Campaigns," which is incorporated herein by reference in its entirety.

BACKGROUND

Embodiments described herein relate generally to managing a universal list system and more particularly to methods and apparatus for managing a universal list based on different types of multimedia advertising campaigns.

Individuals often place items for which they intend to purchase on a hand-written shopping list. While shopping, such a hand-written shopping list can remind an individual of items they intend to purchase. For example, an individual can make a list containing items used to perform a user-performed process (e.g., a recipe, a home improvement project, an activity, etc.). Such a list can then be used to remind the user to purchase such items to perform the user-performed process.

Such hand-written shopping lists, however, can be easily lost and can only be updated by a user in physical possession of the list. For example, a user might be unable to add an item to the shopping list when they initially realize they should purchase the item because they do not physically posses the list. Further, the user might forget to add the item to the shopping list at a later time when they come into physical possession of the list. Additionally, each item associated with a user-performed process typically is manually added to a hand-written list via a single mode (i.e., using pen and paper).

Accordingly, a need exists for methods and apparatus for updating a universal list via multiple communication modes. Additionally, a need exists for methods and apparatus for easily adding items associated with a user-performed process to a universal list.

SUMMARY

In some embodiments, a non-transitory processor-readable medium includes code to cause a processor to receive, via a first communication mode, a first indicator associated with a first user-performed process, and receive, via a second communication mode different from the first communication mode, a second indicator associated with a second user-performed process. The code includes code to cause the processor to identify, using the first indicator a first set of items for the first user-performed process, and identify, using the second indicator, a second set of items for the second user-performed process. The code further includes code to cause the processor to define a vendor-agnostic list to include the first set of items and the second set of items, and send a signal associated with at least a portion of the vendor-agnostic list to a communication device.

BRIEF DESCRIPTION OF THE DRAWINGS

FIG. 3 is an illustration of a process database, according to another embodiment.

FIG. 4A is an illustration of a user database, according to another embodiment.

FIG. 4B is an illustration of a universal list database, according to another embodiment.

DETAILED DESCRIPTION

Figure 1:
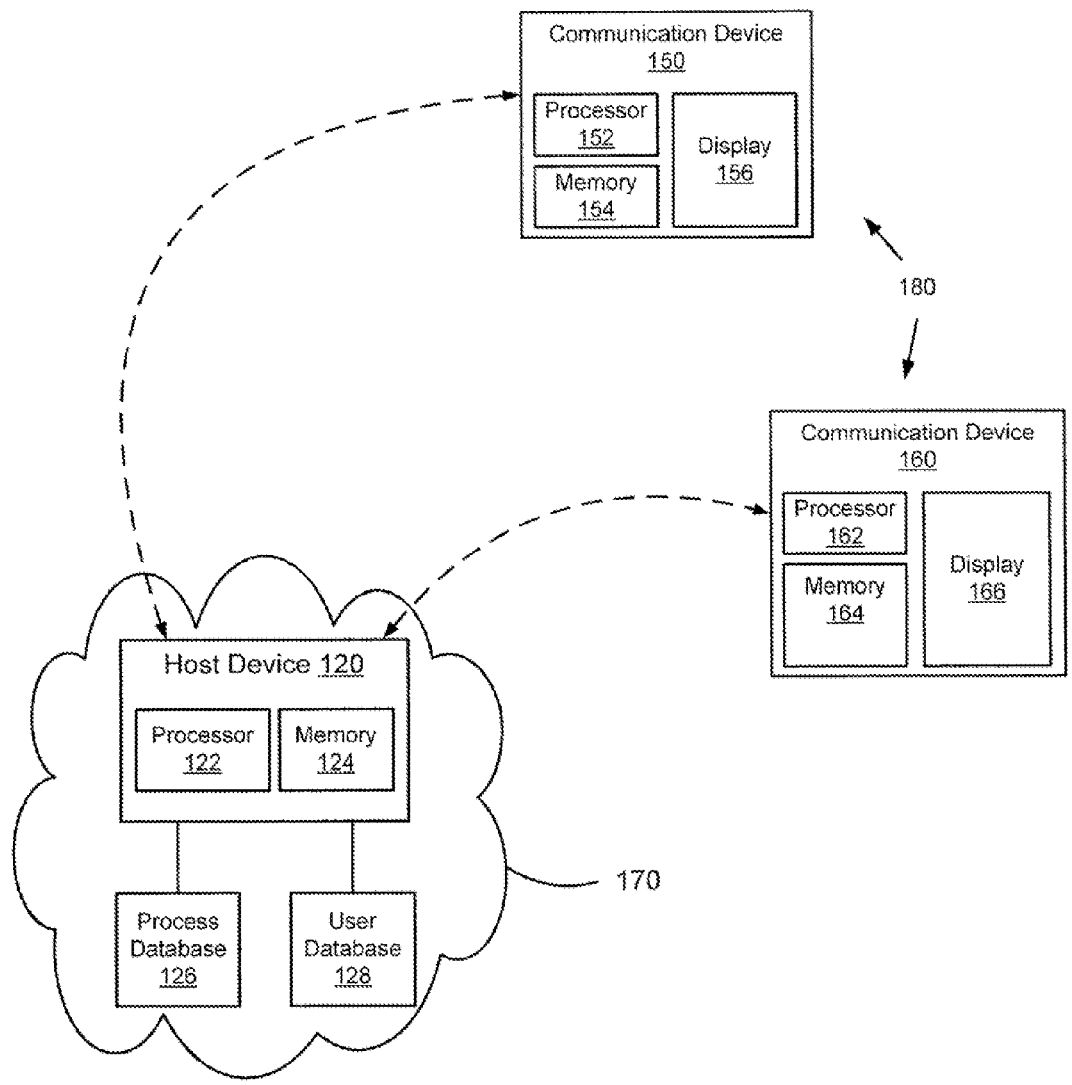
FIG. 1 is a schematic diagram that illustrates communication devices in communication with a host device via a network, according to an embodiment.

In some embodiments, a non-transitory processor-readable medium includes code to cause a processor to receive, via a first communication mode, a first indicator associated with a first user-performed process, and receive, via a second communication mode different from the first communication mode, a second indicator associated with a second user-performed process. The code includes code to cause the processor to identify, using the first indicator, a first set of items for the first user-performed process, and identify, using the second indicator, a second set of items for the second user-performed process. The code further includes code to cause the processor to define a vendor-agnostic list to include the first set of items and the second set of items, and send a signal associated with at least a portion of the vendor-agnostic list to a communication device.

In such embodiments, a user can add items associated with a user-performed process to their vender-agnostic list using multiple communication modes. For example, the first communication mode can be one of email, text messages (e.g., short message service (SMS) messages), instant messages, optical pattern transmissions (e.g., a high capacity color barcode, a QR code, a two-dimensional barcode, a one-dimensional barcode, a black light pattern, etc.), RF pattern transmissions, a mobile device application, a website, a personal computer (PC) application, an interactive advertisement (e.g., a Flash advertisement on a website), an interactive television (ITV) application (e.g., user uses their TV remote to select and/or enter process ID), TCP/IP transmissions, interactive voice response (e.g., via touch tones and/or voice recognition), and/or the like. Similarly, the second communication mode can be a different one of email, text messages (e.g., SMS messages), instant messages, optical pattern transmissions, RF pattern transmissions a mobile device application, a website, a personal computer (PC) application, an interactive advertisement (e.g., a Flash advertisement on a website), an ITV application, TCP/IP transmissions, interactive voice response (e.g., via touch tones and/or voice recognition), and/or the like. Additionally, using the first indicator, each item associated with the first user-performed process can be added to a user's vendor-agnostic list. Similarly, using the second indicator, each item associated with the second user-performed process can be added to the user's vendor agnostic list.

In some embodiments, an apparatus includes a first communication module, a second communication module, an item module and an action module. The first communication module is configured to receive, from a first communication device via a first communication mode, an indicator associated with a user-performed process. The second communication module configured to receive, from a second communication device via a second communication mode different than the first communication mode, the indicator associated with the user-performed process. The item module is configured to query a process database, using the indicator, for a set of items used to perform the user-performed process. The action module is configured to provide a first vendor-agnostic list including the set of items to the first communication device. Similarly, the action module is configured to provide a second vendor-agnostic list including the set of items to the second communication device.

In some embodiments, a non-transitory processor-readable medium includes code to cause a processor to receive, via a set of communication modes, a set of indicators. Each indicator from the set of indicators is uniquely associated with a user-performed process from a set of user-performed processes. The code includes code to cause the processor to identify, for each user-performed process from the set of user-performed processes, a set of items for that user-performed process. The code further includes code to cause the processor to define a vendor-agnostic list to include the set of items for each user-performed process from the set of user-performed processes and associate the vendor-agnostic list with an account of a user.

As used herein, a "universal list" (also referred to as a "vendor-agnostic list") can include a list to which a user can add items. A universal list is vendor-agnostic and not specific and/or limited to any single vendor and/or entity. Accordingly, identifiers (e.g., names, pictures, etc.) of products from different manufacturers, sold at different stores and/or provided by different suppliers can be added to and/or removed from a universal list. Similarly, coupons from different stores and/or manufacturers can be added to and/or removed from a universal list. A user can use a universal list provided by a universal list system and/or service to shop for, locate and/or, as a reminder, to purchase the items on the universal list.

As used in this specification, the singular forms "a," "an" and "the" include plural referents unless the context clearly dictates otherwise. Thus, for example, the term "module" is intended to mean a single module or a combination modules.

FIG. 1 is a schematic diagram that illustrates communication devices 180 in communication with a host device 120 via a network 170, according to an embodiment. Specifically, communication device 150 is configured to communicate with the host device 120. Similarly, communication device 160 is configured to communicate with the host device 120. The network 170 can be any type of network (e.g., a local area network (LAN), a wide area network (WAN), a virtual network, a telecommunications network) implemented as a wired network and/or wireless network. As described in further detail herein, in some embodiments, for example, the communication devices 180 are personal computers connected to the host device 120 via an Internet Service Provider (ISP) and the Internet (e.g., network 170).

In some embodiments, the communication devices 180 can communicate with the host device 120 and the network 170 via intermediate networks and/or alternate networks. Such intermediate networks and/or alternate networks can be of a same type and/or a different type of network as network 170. As such, in some embodiments, the communication devices 180 can send data to and/or receive data from the host device 120 using multiple communication modes (e.g., email, text messages, instant messages, optical pattern transmissions, using a mobile device application, via a website, using a personal computer (PC) application, an interactive advertisement, an ITV, TCP/IP transmissions, interactive voice response (e.g., via touch tones and/or voice recognition), etc.) that may or may not be transmitted to the host device 120 using a common network. For example, as described in further detail herein, the communication devices 180 can be mobile telephones (e.g., smart phones) connected to the host device 120 via a cellular network and the Internet (e.g., network 170).

The host device 120 can be any type of device configured to send data over the network 170 to and/or receive data from one or more of the communication devices 180. In some embodiments, the host device 120 can be configured to function as, for example, a server device (e.g., a web server device), a network management device, a data repository and/or the like.

The host device 120 includes a memory 124 and a processor 122. The memory 124 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 124 of the host device 120 includes data used to update a universal list associated with a user-performed process (e.g., a cooking recipe, a home improvement project, an activity, etc.). In such embodiments, for example, the host device 120 is configured to add, remove, revise and/or edit a universal list based on a signal received from a communication device 180 using one or more communication modes. In some embodiments, the memory 124 stores instructions to cause the processor to execute modules, processes and/or functions associated with such a universal list system and/or service.

The processor 122 of the host device 120 can be any suitable processing device configured to run and/or execute a universal list system and/or service. For example, the processor 122 can be configured to update a universal list in response to receiving a signal from a communication device 180, as described in further detail herein. More specifically, as described in further detail herein, the processor 122 can be configured to execute modules, functions and/or processes to update universal lists to include items associated with a user-performed process (e.g., a cooking recipe, a home improvement project, an activity, etc.). Similarly, as described in further detail herein, the processor 122 can be configured to execute modules, functions and/or processes to add items, instructions and/or directions associated with a user-performed process to a user-performed process collection. In some embodiments, the processor 122 can be a general purpose processor, a Field Programmable Gate Array (FPGA), an Application Specific Integrated Circuit (ASIC), a Digital Signal Processor (DSP), and/or the like.

The host device 120 is operatively coupled to a process database 126 and a user database 128. The process database 126 and the user database 128 can be any suitable databases such as, for example, relational databases, object databases, object-relational databases, hierarchical databases, network databases, entity-relationship databases, and/or the like. While shown in FIG. 1 as being separate from the host device 120, in other embodiments the process database 126 and/or the user database 128 can be part of the host device 120. For example, the process database 126 and/or the user database 128 can be stored in the memory 124. Additionally, while shown in FIG. 1 as being separate databases, in other embodiments the process database 126 and/or the user database 128 can be part of a single database. As described in further detail herein, the host device 120 (hosting the universal system and/or service) can use the process database 126 and the user database 128 to update a universal list.

The process database 126 is configured to store and/or maintain data associated with various user-performed processes. More specifically, and as described in further detail herein with respect to FIG. 3, the process database 126 can store a relationship between an identifier of a user-performed process and an identifier for each item used to implement and/or perform that user-performed process. For example, the process database 126 can store a relationship between a process identifier of a recipe and representations for the ingredients used in that recipe. For another example, the process database 126 can store a relationship between a process identifier of a home improvement project and representations for the supplies used to complete that home improvement project. As such, the host device 120 can query and/or search the process database 126, using the process identifier of the user-performed process, for the items (e.g., ingredients, supplies, tools, etc.) used to implement and/or perform that user-performed process. Accordingly, a user of a communication device 180 can update a universal list to include the items associated with a user-performed process by sending the process identifier of the user-performed process to the host device 120. In some embodiments, the process database 126 can store a relationship between a process identifier of a user-performed process and directions and/or instructions used to implement that user-performed process.

In some embodiments, the process database 126 can also store metadata associated with various user-performed processes. In such embodiments, for example, the process database 126 can store a difficulty associated with a user-performed process, a preparation time associated with a user-performed process, an execution time (e.g., cook time) associated with a step of a user-performed process, a total time to complete associated with a user-performed process, and/or the like. Such information can be added to a user's universal list and/or user-performed process collection when that user-performed process is added to the user's universal list and/or user-performed process collection.

The user database 128 is configured to store and/or maintain data associated with various users. More specifically, and as described in further detail herein with respect to FIG. 4A, the user database 128 can store a relationship between a user identifier and various methods of identifying that user. For example, the user database 128 can store a relationship between a user identifier and that user's email address, telephone number, login name, instant message identifier, a communication device identifier (e.g., a mobile phone identifier, a media access control (MAC) address, etc.), and/or the like. Accordingly, if the host device 120 receives a text message and/or a voice message from a telephone number, the host device 120 can query and/or search the process database 126, using the telephone number, for the user identifier with which that telephone number is associated. Similarly, if the host device 120 receives an email message from an email address or an instant message from a user having an instant message identifier, the host device 120 can query and/or search the user database 128, using the email address or the instant message identifier, respectively, for the user identifier with which that email address or instant message identifier is associated. Accordingly, the host device 120 can correlate information and/or data received from a user via multiple communication modes with a single user account associated with that user.

Each of the communication devices 180 can be, for example, a computing entity (e.g., a personal computing device such as a desktop computer, a laptop computer, etc.), a mobile phone, a monitoring device, a personal digital assistant (PDA), an optical pattern and/or tag scanner (e.g., a high capacity color barcode scanner, a quick response (QR) code scanner, a two-dimensional barcode scanner, a one-dimensional barcode scanner, a black light pattern scanner, etc.), a radio frequency (RF) pattern scanner, a standard mobile telephone, a tablet PC, a TV set top box, and/or so forth. Although not shown, in some embodiments, each of the communication devices 180 can include one or more network interface devices (e.g., a network interface card) configured to connect the communication devices 180 to the network 170. In some embodiments, the communication devices 180 can be referred to as client devices.

As shown in FIG. 1, the communication device 160 has a processor 162, a memory 164, and a display 166. The memory 164 can be, for example, a random access memory (RAM), a memory buffer, a hard drive, and/or so forth. The display 166 can be any suitable display, such as, for example, a liquid crystal display (LCD), a cathode ray tube display (CRT) or the like. Similar to communication device 160, the communication device 150 has a processor 152, a memory 154, and a display 156. In other embodiments, the communication devices 150, 160 include another output device instead of or in addition to the displays 156, 166. For example, the communication devices 150, 160 can include an audio output device (e.g., a speaker), a tactile output device, and/or the like.

In some embodiments, one or more portions of the host device 120 and/or one or more portions of the communication devices 180 can include a hardware-based module (e.g., a digital signal processor (DSP), a field programmable gate array (FPGA)) and/or a software-based module (e.g., a module of computer code stored in memory and/or executed at a processor). In some embodiments, one or more of the functions associated with the host device 120 (e.g., the functions associated with the processor 122) can be included in one or more modules (see, e.g., FIG. 2). In some embodiments, one or more of the functions associated with the communication devices 180 (e.g., functions associated with processor 152 or processor 162) can be included in one or more modules. In some embodiments, one or more of the communication devices 180 can be configured to perform one or more functions associated with the host device 120, and vice versa.

Figure 2:
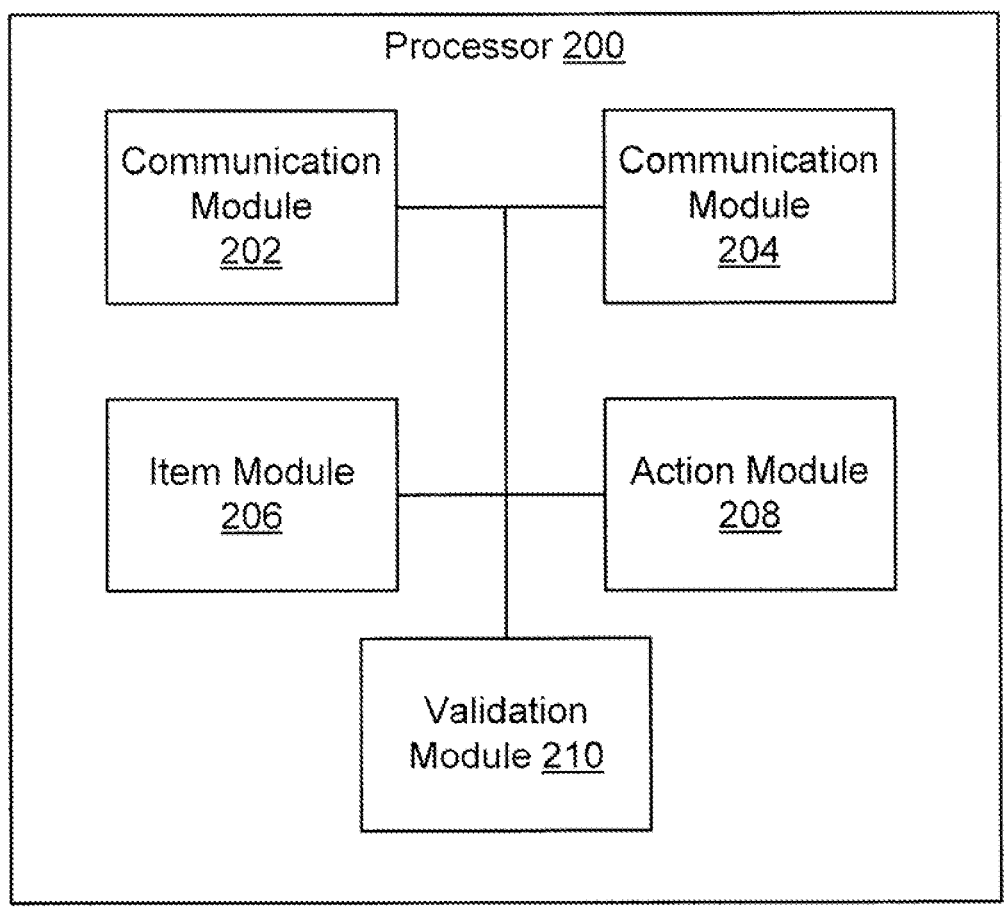
FIG. 2 is a schematic illustration of a processor of a host device, according to another embodiment.

FIG. 2 is a schematic illustration of a processor 200 of a host device hosting a universal list system and/or service, according to another embodiment. In some embodiments, the processor 200 can be similar to the processor 122 of the host device 120. More specifically, the processor 200 can be any suitable processing device configured to update a universal list using multiple communication modes.

The processor 200 includes multiple communication modules 202, 204, an item module 206, an action module 208, and a validation module 210. While each module is shown in FIG. 2 as being in direct communication with every other module, in other embodiments, each module need not be in direct communication with every other module. Moreover, in other embodiments, any other number of modules can be included within the processor 200.

The communication modules 202, 204 are configured to receive a message from a communication device (e.g., communication device 150 or 160) via a communication mode (e.g., an email, a text message, an instant message (IM), an optical pattern transmission, using a mobile device application, via a website, using a personal computer (PC) application, etc.). More specifically, the communication module 202 can be configured to receive a message from a communication device via a first communication mode and the communication module 204 can be configured to receive a message from the communication device via a second communication mode. Accordingly, the processor 200 can receive messages in different formats and/or via different communication modes. For example, communication module 202 can be configured to receive a message having a process identifier of a user-performed process via an email (e.g., formatted as an email) while communication module 204 can be configured to receive a message having a process identifier of a user-performed process via an SMS message (e.g., formatted as an SMS message). In other embodiments, the processor 200 can include any number of communication modules and can be configured to receive messages using any number of different communication modes.

The item module 206 can be configured to query a process database (e.g., process database 126 shown and described with respect to FIG. 1) for items used to perform a user-performed process. For example, after receiving a process identifier of a user-performed process, a communication module 202 or 204 can send the process identifier to the item module 206 such that the item module 206 can use the process identifier to query the process database. Based on the process identifier, the item module 206 can retrieve item identifiers associated with the items used to perform the user-performed process identified by the process identifier.

FIG. 3, for example, illustrates a process database 300. The process database 300 can be structurally and functionally similar to the process database 126 shown and described with respect to FIG. 1. The process database 300 includes a process identifier (ID) column 310, a process name column 320, and an items involved column 330. The process ID column 310 can include process identifiers associated with user-performed processes, the process name column 320 can include a name and/or title of the user-performed process, and the items involved column 330 can include a name, title and/or item identifier associated with items used to perform and/or complete the user-performed process. For example, the process ID 1 can be associated with a user-performed process having a process name of "Painting a Room." The items involved with the user-performed process of "Painting a Room" can include (1) Paint, (2) Tarp, (3) Paint Brushes, and (4) Paint Roller. For another example, the process ID 2 can be associated with a user-performed process having a process name of "BBQ Chicken." The items involved with the user-performed process of "BBQ Chicken" can include (1) BBQ Sauce and (2) Chicken Breasts. Accordingly, using the items associated with the process ID 1, a user can paint a room. Similarly, using the items associated with the process ID 2, a user can cook BBQ chicken. Accordingly, if the item module 206 (FIG. 2) receives a process identifier of 1 from a communication module 202 or 204, the item module 206 can query the process database 300 using the process identifier (e.g., 1) to retrieve the process name "Painting a Room" and the item identifiers "(1) Paint, (2) Tarp, (3) Paint Brushes, and (4) Paint Roller."

While shown in FIG. 3 as a numeric identifier, the process ID can include any number and combination of alphanumeric characters. In some embodiments, for example, the process ID can be an alphanumeric string such as, for example, "davesbbqchicken", "pastasauce179", "ming608", "currychicken", "roompainting", and/or the like. In some embodiments, the process ID can be a random identifier. In other embodiments, a first portion of the process ID can be predetermined (e.g., a prefix associated with a domain name, brand, company, etc.) and a second portion of the process ID can be random.

In some embodiments, the process IDs can be defined using one or more specific processes. For example, such a process can include removing alphanumeric characters that may cause confusion (e.g., ones (1) and els (l), and zeros (0) and o's), making the process IDs case insensitive, removing expletives and/or inappropriate words from the process IDs, removing vowels from the process IDs, limiting placement and/or a number of vowels within a process ID, and/or the like.

While not shown in FIG. 3, in some embodiments the process database 300 can include quantity information for the items associated with a process. For example, the item identifiers (i.e., BBQ Sauce and Chicken Breasts) for the process of "BBQ Chicken" can include "2 Cups of BBQ Sauce" and "2 Chicken Breasts." Accordingly, a user can determine a quantity and/or amount of each item to purchase to complete and/or perform the process.

Additionally, as described above with respect process database 126 of FIG. 1, in some embodiments, the process database 300 can also store metadata associated with various user-performed processes. In such embodiments, for example, the process database 300 can store a difficulty associated with a user-performed process, a preparation time associated with a user-performed process, a cook time associated with a recipe, a total time to complete associated with a user-performed process, and/or the like. Such information can be added to a user's universal list and/or user-performed process collection when that user-performed process is added to the user's universal list and/or user-performed process collection.

While not shown in FIG. 3, in some embodiments the process database 300 can store a relationship between a process identifier of a user-performed process and directions and/or instructions used to implement and/or perform that user-performed process. In such embodiments, for example, the process database 300 can include instructions for "Painting a Room" associated with the process ID "1". For another example, the process database 300 can include instructions for cooking "BBQ Chicken" associated with the process ID "2".

Returning to FIG. 2, the validation module 210 can be configured to query a user database (e.g., user database 128) for a user identifier and/or account number. In some embodiments, the validation module 210 can query the user database using a telephone number, an email address, an instant message identifier, a social network account username and/or password, a private third party authentication identifier (e.g., user logs in with the third party), and/or any other communication identifier (e.g., a mobile phone identifier, a MAC address, etc.). For example, if the communication module receives an SMS message from a telephone, the validation module 210 can query the user database to determine with which user and/or account that telephone number is associated. Similarly, if the communication module 202, 204 receives an email from an email address or an instant message from an instant message account having an instant message username, the validation module 210 can query the user database to determine with which user and/or account the email address or instant message username is associated.

FIG. 4A, for example, illustrates a user database 400. The user database 400 includes a user identifier (ID) column 410, a telephone number column 420, an email address column 430 and an instant message identifier (IM ID) column 440. The user ID column 410 can include identifiers and/or accounts of users of the universal list system and/or service. For example, "Cool1" can be a user name of a user of the universal list system and/or service. The other columns (telephone number column 420, email address column 430 and IM ID column 440) associate a user ID with a telephone number, an email address and/or an IM ID, respectively. For example, the telephone number of the user with the user ID of "Cool1" can be "(200) 877-3309." Accordingly, when a communication module 202 or 204 receives an SMS message from the telephone number "(200) 877-3309," processor 200 (using the validation module 210) can associate the contents and/or request of that SMS message with the account of the user with the user ID "Cool1." Similarly, if a communication module 202 or 204 receives an email message from the email address "H4@isp2.com," processor 200 (using the validation module 210) can associate the contents and/or request of that email message with the account of the user with the user ID "Hut20."

In some embodiments, a user can register any number of identifiers (e.g., telephone numbers, email addresses, IM IDs, etc.) with the universal list system and/or service. For example, while shown in FIG. 4A as each user having a single email address, in other embodiments, any of the users can associate their user ID and/or account with multiple email addresses. Similarly, each user can associate their user ID and/or account with multiple telephone numbers, multiple IM IDs and/or the like. Additionally, in some embodiments, a user does not associate their user ID and/or account with every type of identifier. For example, the user ID "Sid6" is not associated with an IM ID and the user ID "Hop45" is not associated with a telephone number.

In some embodiments, additional verification can be used to ensure that a user sending a process ID via a communication mode is the user associated with the identifier (e.g., the phone number, email address, IM ID, username, etc.) received with the process ID. In such embodiments, for example, a user can be asked to supply a username, a password, a personal identification number (PIN), a token and/or the like to the universal list system and/or service when attempting to add one or more items to their universal list. For example, when logging into a mobile application and/or website, the user can supply a username and/or a password. For another example, when emailing a process ID to a universal list system and/or service, the user can be asked to provide a PIN with the email and/or to provide a PIN at a link provided by a response email. For yet another example, in response to emailing a process ID to a universal list system and/or service, the user can be sent a response email having a link (e.g., embedded with a user ID, PIN, and/or token) to confirm the addition of the one or more items to their universal list. After the user selects the link, the item can be added to the user's universal list. In other embodiments, such a link can be to a website at which the user can provide additional identification (e.g., a token, a password, a PIN, etc.). In other embodiments, any other combination of verification methods can be used to increase security of a user's universal list.

In some embodiments, different levels and/or types of verification can be used depending on the communication mode used to send the process ID. For example, if a user sends an SMS message containing a process ID to a universal list system and/or service, the universal list system and/or service might not ask for another form of identification. For another example, if a user sends a process ID to a universal list system and/or service using an instant messaging service, the universal list system and/or service might ask for an additional PIN and/or password (e.g., within a browser window) before the items are added to the universal list. In some embodiments, a user can set, define and/or change permission and verification levels (e.g., the number and type of verification mode(s)) for each communication mode associated with their account.

Returning to FIG. 2, the action module 208 can be configured to update (e.g., edit, add to, remove from, etc.) a universal list associated with a user of the universal list system and/or service. More specifically, the action module 208 is configured to receive item identifiers from the item module 206 and a user ID and/or account number from the validation module 210. Based on the user ID and/or account number, the action module 208 can add the item identifiers associated with a user-performed process to a universal list associated with that user ID and/or account number. As described in further detail herein, in some embodiments, the action module 208 can perform additional actions with respect to a universal list. In some embodiments, for example, the action module 208 can define a new universal list, share a universal list with another user, associate additional attributes with an item and/or process on the universal list and/or the like.

In some embodiments, the action module 208 can update a universal list database that stores each user's universal list. More specifically, based on the user ID and/or account number, the action module can add the item identifiers associated with a user-performed process to a record of that user's universal list in the universal list database. FIG. 4B, for example, illustrates a universal list database 450. The universal list database 450 includes a user ID column 460 and an item column 470. The user ID column 460 can include a list and/or entry for each user having a universal list. The item column 470 can include the items associated with the users in the user ID column 460. For example, the universal list associated with the user ID "Cool1" includes "Skim Milk," the universal list associated with user ID "Hut20" includes "BBQ Sauce" and "Chicken Breasts," and the universal list associated with the user ID "Hop45" includes "Paint," "Tarp," "Paint Brushes," and "Paint Roller." In some embodiments, based on a user ID and/or account number, the action module can add item identifiers associated with one or more items to the record of that user's universal list in the universal list database 450. Thus, for example, if the user having the user ID of "Cool1" sends the process ID of "2" (e.g., FIG. 3) to communication module 202 of processor 200, the action module 208 can add "BBQ Sauce" and "Chicken Breasts" (i.e., the items associated with BBQ Chicken) to a record (e.g., add rows) associated with "Cool1" in the universal list database 450. Similarly, if the action module 208 receives an indication from a communication device associated with the user "Hut20" to remove the items associated with promotion ID "2" (e.g., via communication module 202), the action module 208 can remove the rows in the universal list database 450 associating "BBQ Sauce" and "Chicken Breasts" (i.e., the items associated with BBQ Chicken) with the user "Hut20." In other embodiments, instead of removing the rows associating "BBQ Sauce" and "Chicken Breasts" with the user "Hut20," the rows can be marked inactive.

For another example, if communication module 202 receives an email from the email address "did7@isp3.com" having a process ID of "1", the communication module 202 can send the email address ("did7@isp3.com") to the validation module 210 and the process ID ("1") to the item module 206. Using the email address ("did7@isp3.com"), the validation module 210 can query the user database 400 for the user ID associated with the email address (i.e., "Sid6") and provide that user ID (i.e., "Sid6") to the action module 208. Similarly, using the process ID (i.e., "1"), the item module 206 can query the process database 300 for the item identifiers associated with the process ID (i.e., Paint, Tarp, Paint Brushes, Paint Roller) and provide the item identifiers to the action module 208. The action module 208 can then add the item identifiers (i.e., Paint, Tarp, Paint Brushes, Paint Roller) to a universal list (e.g., a record within universal database 450) associated with the account identified by the user ID "Sid6." As described in further detail herein, in some embodiments, if the account identified by the user ID "Sid6" does not already have a record in the universal list database 450, a record can be defined. Accordingly, the user ("Sid6") can use the universal list to shop for, locate and/or, as a reminder, to purchase the items used to paint a room.

A user can access, update and/or view their universal list by accessing the universal list database 450 via a communication device. More specifically, a host device can query the universal list database 450 for an indicator of each item associated with a user ID and send the indicators to the communication device. The communication device can use the indicators to render the list on a display.

In some embodiments, such a universal list database 450 can be stored at and/or coupled to, for example, a host device (e.g., such as host device 120 of FIG. 1). In other embodiments, the record of each user's universal list can be stored locally at a communication device (e.g., communication device 150 or 160 of FIG. 1).

In some embodiments, a user can also send commands to the processor 200 (i.e., via a communication mode) to update the items on their universal list (e.g., update a quantity of the item) associated with a process and/or remove the items from the universal list associated with a process. In such embodiments, for example, the user can provide a command and/or instruction with the process identifier when sending a message to the processor 200. Such a command and/or instruction can be sent using any suitable format, such as, for example, <command, process ID>. For example, if the processor 200 receives an instruction of <remove, 1> via a communication mode, the processor 200 (e.g., through a removal module not shown in FIG. 2) can remove the items associated with the process associated with the process ID of 1 (e.g., "Painting a Room") from the user's universal list.

In some embodiments, such commands can include a store identifier. For example, a user can assign a store when sending an instruction to remove an item from their universal list. For example, the command <remove, 1, store x> can remove the item with the promotion ID of "1" from their universal list. Such a command can also indicate that they purchased the item with the promotion ID of "1" at "store x." For another example, a user can assign a store when sending an instruction to add an item to their universal list. For example, the command <add, 5, store y> can add the item with the promotion ID of "5" to their universal list. Such a command can also indicate that they intend to purchase the item with the promotion ID of "5" at "store y." Such an indication can be used to add a price of the item with the promotion ID of "5" at "store y" to the user's universal list.

Similarly, in some embodiments, a user can also send commands to the processor 200 (i.e., via a communication mode) to add an item to the user's universal list, remove an item from the user's universal list and/or update an item on the user's universal list that is not associated with a user-performed process. For example, the user can send a message to the processor 200 to add a single item to their universal list. For example, a user can add to their universal list an item such as "1 gallon of milk," that is not associated with any particular user-performed process. Accordingly, the user can use their universal list to shop for, locate and/or as a reminder to purchase both items associated with a specific process and items not associated with a specific process.

In some embodiments, a user can also add coupons to their universal list. In such embodiments, for example, a user can send, via a communication mode, an identifier of a coupon to the processor 200 (i.e., via a communication mode) to add a representation of the coupon to the user's universal list. In some embodiments, the processor 200 can add a representation of the item(s) associated with the coupon to the user's universal list along with the representation of the coupon. In some embodiments, the user can present the coupon (e.g., that can be stored in a memory) via a communication device (e.g., a mobile telephone, PDA, etc.) when purchasing the item(s) associated with the coupon. In such embodiments, for example, the representation of the coupon can be an optical tag and/or pattern (e.g., a barcode), a number, and/or the like, associated with the coupon and/or a link to an optical pattern, a number and/or the like, associated with the coupon. In some embodiments, the user can have the option to print the coupon, email the coupon, and/or the like. For example, a link can be presented to the user via which the user can access and print and/or email a copy of the coupon.

In some embodiments, each user can have a profile associated with preferences. For example, a user can have a preference associated with user-performed processes such that a particular version of a user-performed process is added to their universal list in response to sending a process ID to the processor 200. Thus, the user can indicate a preferred substitution for certain ingredients or items, preferred type of recipe (e.g., lactose free recipe, allergy free recipe, high-altitude recipe, etc.), preferred units (e.g., metric vs. English), a preferred vendor or store (e.g., a grocery store, hardware store, etc.), and/or the like. In such embodiments, based on the user's preferences, different items and or versions of a process can be added to the user's universal list. For example, based on the user profiles, a first version of a user-preformed process might be added to a first user's universal list using a process ID while a second version of the user-performed process might be added to a second user's universal list using the same process ID. Additionally, as described in further detail herein, alerts associated with the items on a universal list can be added based on a user profile. This allows users to personalize their universal lists.

In some embodiments, a different version of a user-performed process can be added to universal lists of different users based on a geographic indication of the communication device. For example, a recipe can be modified based on altitude, climate, cultural differences and/or the like. Similarly, a promotion, item price, store at which to purchase an item, and/or the like can be different based on geographic information. For example, a manufacturer can have a promotion for a product (e.g., individually added to a universal list or added in association with a user-performed process) with a first price in a first geographic region and a promotion for the product with a second price in a second geographic region. Thus, two users who provide the same process ID to a universal list system and/or service can have different characteristics associated with the item(s) associated with that process ID based on the geographic location of the different users. Such a geographic location can be determined using a global positioning system (GPS) of the communication device, triangulation, an interne protocol (IP) address of the communication device, a user profile, and/or the like. Similarly, in some embodiments, a promotion, item price, store at which to purchase an item, and/or the like can be different based on other factors, such as, for example, time of day, day of week, purchase history, purchase history of similar users, purchase history of friends, and/or the like.

In some embodiments, the action module 208 can also update a user-performed process collection. Such a user-performed process collection can be a grouping and/or collection of user-performed processes associated with a user (e.g., that a user has added to their user-performed process collection). In some embodiments, a user-performed process collection includes items, instructions and/or directions to perform the user-performed process. For example, a user-performed process collection can be a recipe box, a home improvement project collection, and/or the like. In some embodiments, the action module 208 can associate a user-performed process with a user's user-performed process collection in response to receiving a process ID associated with that user-performed process from a communication mode associated with that user. In such embodiments, a user can view the user-performed processes stored in their user-performed process collection at a later time by accessing their user-performed process collection (e.g., via a website).

In some embodiments, a user can decide whether to add a user-performed process to their user-performed process collection, to add the items associated with the user-performed process to their universal list and/or both. In such embodiments, in response to receiving a process ID, the universal system and/or service performed by processor 200 can, for example, present an option to a user. The user can then select (e.g., on a communication device) to add the user-performed process associated with that process ID to their user-performed process collection, to add the items associated with the user-performed process associated with that process ID to their universal list and/or both.

In other embodiments, whether or not the user is presented such an option can be based on the process ID. In such embodiments, for example, in response to receiving a first process ID, the universal system and/or service performed by processor 200 can, for example, present such an option to a user, while in response to receiving a second process ID, the universal system and/or service can automatically add the user-performed process associated with the second process ID to the user's user-performed process collection, automatically add the items associated with the user-performed process to the user's universal list and/or both. In some embodiments, a company associated with the process ID (e.g., a retailer, a brand, a company, etc.) can determine whether or not to provide such an option to users.

Figure 5A:
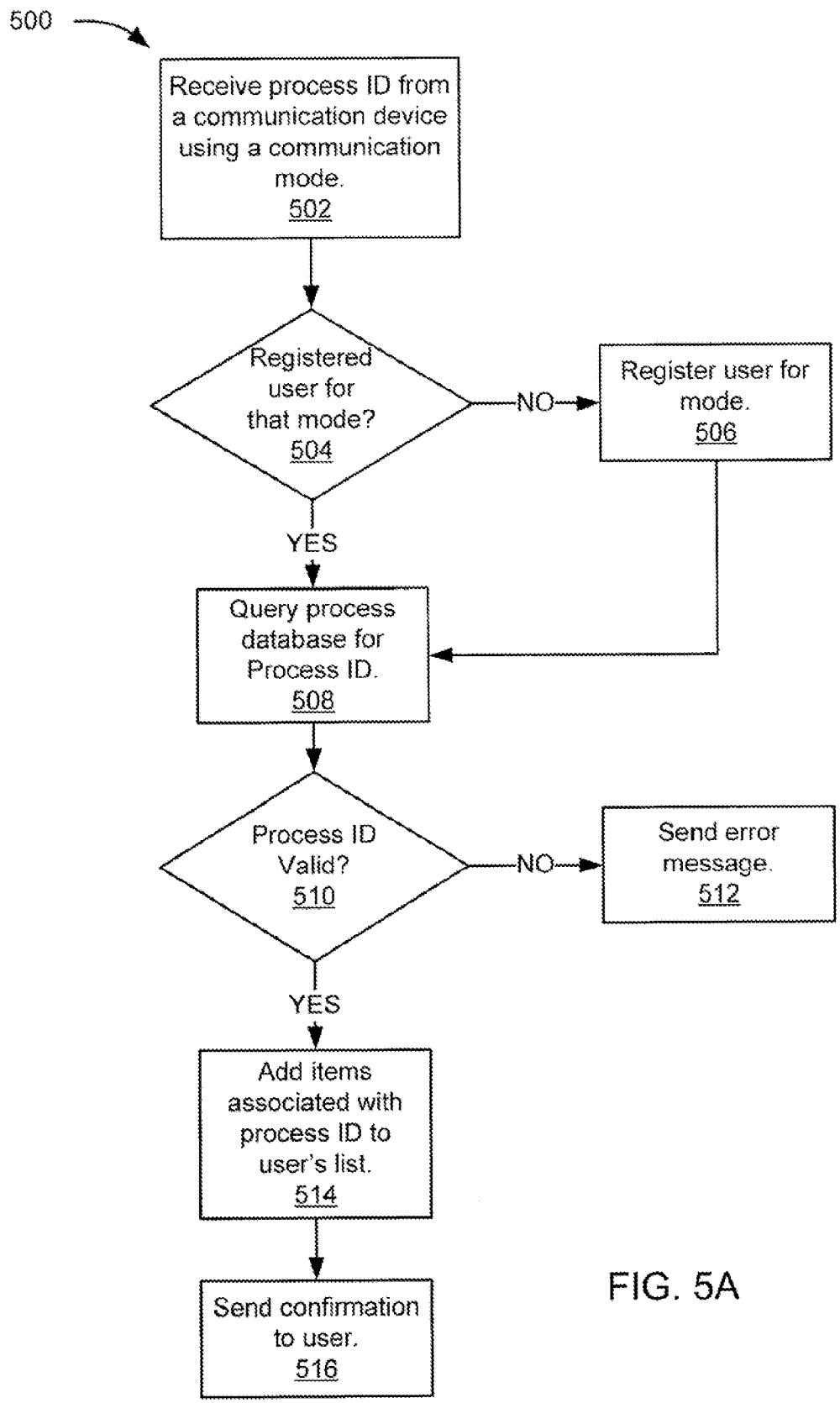
FIGS. 5A, 5B and 6 are flow charts illustrating methods of updating a universal list, according to other embodiments.

FIG. 5A is a flow chart illustrating a method 500 of updating a universal list, according to another embodiment. In some embodiments, the method 500 can be performed and/or executed at a host device similar to the host device 120 shown and described with respect to FIG. 1. Accordingly, in some embodiments, a processor at a host device, similar to the processor 200 shown and described with respect to FIG. 2, can execute instructions that cause the processor to perform the method 500. The method 500 can be performed as part of a universal list system and/or service.

The method 500 includes receiving a process identifier (ID) from a communication device using a communication mode, at 502. More specifically, in some embodiments, a communication module (similar to the communication modules 202 and 204 shown and described with respect to FIG. 2) can receive the process ID from the communication device. In some embodiments, the process ID can be associated with a user-performed process, such as, for example, a recipe, a home improvement project, and/or the like.

The process ID can be received from the communication device in response to the process ID being presented to a user of the communication device. The process ID can be presented to a user in any suitable manner such that the user views and/or obtains the process ID. For example, the process ID for a process can be presented to a user on a website (e.g., a blog-post, on a social network website (e.g., a tweet), on a manufacturer's website, using a Flash advertisement, etc.), in a print medium (e.g., newspaper, magazine, on a product and/or product packaging, etc.), on a television display, over an audio medium (e.g., radio, podcast, etc.), by word of mouth (e.g., a referral), and/or the like. Additionally, the process ID can be presented to a user in any suitable form. For example, the process ID for a process can be presented to a user using the actual numerical and/or alphanumeric process ID (e.g., visually, audibly and/or tactilely), an optical pattern (e.g., a high capacity color barcode, a QR code, a two-dimensional barcode, a one-dimensional barcode, a black light pattern, etc.), an RF pattern, within an application on a PC or mobile device, and/or the like. In some embodiments, such an optical pattern can be printed on a product, a product's packaging, in an advertisement, and/or the like such that a user can easily scan the pattern to add the product to their universal list.

The user can send the process ID to the host device using any suitable communication mode (e.g., any suitable format), such as, for example, an email message, a text message (e.g., an SMS message), an instant message, an optical pattern transmission (e.g., after scanning the optical pattern encoding the process ID), using a mobile device application, via a website, using a personal computer (PC) application, and/or the like. Accordingly, the process ID can be received at the host device using the communication mode the user used to send the process ID.

The host device can then determine if the user sending the process ID is registered to use that communication mode to update their universal list, at 504. More specifically, the host device can query a user database (similar to the user database 400 shown and described with respect to FIG. 4A) using a communication identifier (e.g., telephone number, email address, instant message identifier, username, login identifier, etc.) associated with the message having the process ID to determine if that communication identifier is associated with a user of the universal list system. For example, referring to the user database 400 of FIG. 4A, if the host device receives a message from the telephone number "(238) 557-7155," the host device can determine that that telephone number is associated with the user "Sid6." If the host device determines that the communication identifier is associated with a user, the host device can proceed to step 508.

If, however, the host device determines that the communication identifier is not associated with a user, the host device can request the user to register the communication identifier, at 506. For example, if the host device receives an instant message from a user having an IM ID of "Sid," the host device can determine that that IM ID is not yet associated with a user. Accordingly, the host device can proceed to step 506 and register the user for that communication mode. More specifically, the host device can send a request to the communication device to register the IM ID (e.g., using the IM service and the IM ID "Sid"). The user of the communication device can register the IM ID by sending their user ID (e.g., Sid6) and/or another identifier (e.g., a password, a registration number, an account number, etc.) associated with their universal list system and/or service account. In response to receiving the user ID, the host device can update the user database to associate the received IM ID (e.g., "Sid") with the received user ID (e.g., "Sid6"). Accordingly, when the host device subsequently receives instant messages from the instant messaging account with the IM ID of "Sid," the host device will be able to associate the instant message with the account having the user ID of "Sid6." In some embodiments, telephone numbers and email addresses can similarly be associated with a user ID.

After the host device determines with which account and/or user the received process ID is associated, the host device queries a process database using the process ID, at 508. Such a process database can be structurally and functionally similar to the process database 126 and/or the process database 300 shown and described with respect to FIGS. 1 and 3, respectively.

The host device determines whether the process ID is valid, at 510. For example, in some embodiments, the host determines if the process ID is in the process database, is available to that user (e.g., is valid in their geographic region), has not expired, and/or the like. If the process ID is not valid, the host device sends an error message to the communication device, at 512. Such an error message can be sent to the communication device using the same communication mode via which the host device received the process ID from the communication device at 502. Accordingly, if the process ID was received from the communication device via an SMS message, the host device can send the error message to the communication device via an SMS message. Similarly, if the process ID was received from the communication device via an email message, the host device can send the error message to the communication device via an email message. In other embodiments, the host device can send the error message via any other communication mode. In still other embodiments, the host device can send the error message via multiple communication modes.

In some embodiments, the error message can notify a user that the process ID was not valid (e.g., not recognized by the host device, not available to the user, expired, etc.). Additionally, if the process ID was not valid, the error message can provide other possible process IDs that are similar to the process ID received from the communication device at 502. For example, if the process ID received from the communication device at 502 is "12345," and the process ID is not valid, the error message can provide valid process IDs "12344" and "12346" and their associated process names to the user. Thus, the user can determine if a typographical error was made when sending the initial process ID and send the correct process ID. In other embodiments, the error message can include an advertisement message, another process identifier related to a process similar to other processes the user previously added to their universal list, an unexpired process ID associated with a related process ID, and/or the like.

If the process ID is valid, the items associated with the process ID are added to the user's universal list, at 514. More specifically, using the process ID, the host device can retrieve the items associated with the user-performed process represented by that process ID. Accordingly, using the process database 300 as an example, if the process ID of 2 is received, an indication of the items "BBQ sauce" and "Chicken Breasts" can be added to the user's universal list (i.e., the list associated with the user identified in step 504 or step 506). In some embodiments, if a user has not yet started a universal list, a new universal list can be defined and the items associated with the process ID added to the new universal list.

In some embodiments, and as described above, the user-performed process, including the items, instructions and/or directions, can also be added to a user's user-performed process collection (e.g., a recipe box, a home improvement project collection, etc.). In other embodiments, and as described above, a user can choose to add the user-performed process to their user-performed process collection and/or to add the items associated with the user-performed process to their universal list.

While not shown in FIG. 5A, in some embodiments, the universal list system and/or service can perform logic rules and/or verification associated with the user's universal list and/or user-performed process collection prior to adding an item and/or user performed process to the user's universal list and/or user-performed process collection. For example, prior to adding an item to a universal list, the universal list system and/or service can check whether the item is already on the user's universal list. Similarly, if an item is already on the universal list, the universal list system and/or service can update a quantity associated with that item, attach a coupon with that item, and/or the like.

A confirmation can then be sent to the user, at 516. The confirmation can provide an indication to the user that the items were added to their universal list and/or that the user-performed process was added to their user-performed process collection. In some embodiments, the confirmation can be sent to the communication device using the same communication mode via which the host device received the process ID from the communication device at 502. Additionally, in some embodiments, the confirmation can include a list of the items added to the user's universal list, a list of the items on the user's universal list, and/or the like. In other embodiments, the confirmation can include a link to the user's universal list and/or the user's user-performed process collection. In some embodiments, the confirmation can also include an advertisement, a promotion, a list of process IDs for similar user-performed processes and/or items, and/or the like. In other embodiments, a confirmation is not sent to the user. In some embodiments, a user can indicate (e.g., using user preferences), whether or not they would like to receive a confirmation in response to adding items to their universal list.

Figure 5B:
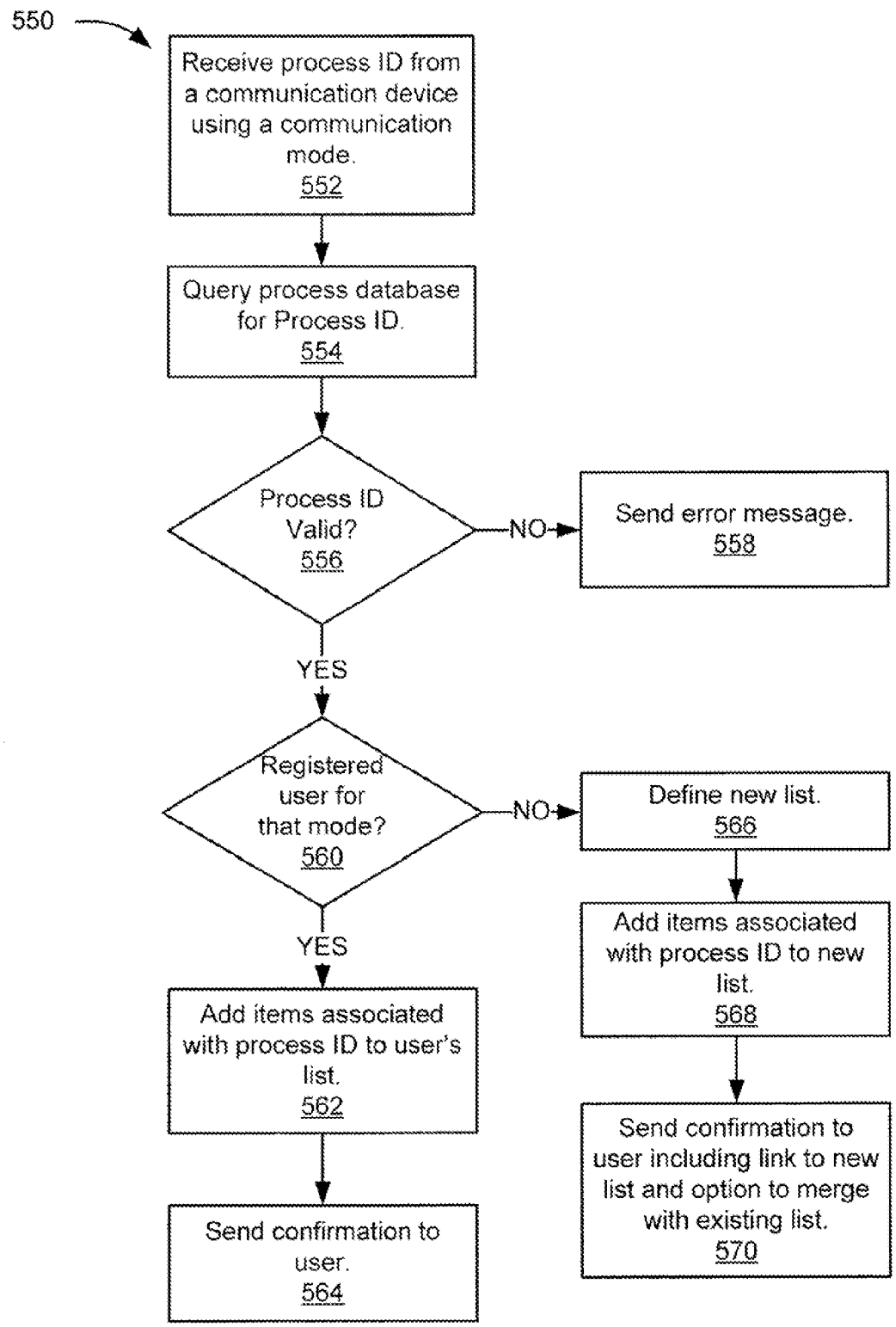

FIG. 5B is a flow chart illustrating a method 550 of updating a universal list, according to another embodiment. Similar to method 500 of FIG. 5A, in some embodiments, the method 550 can be performed and/or executed at a host device similar to the host device 120 shown and described with respect to FIG. 1. Accordingly, in some embodiments, a processor at a host device, similar to the processor 200 shown and described with respect to FIG. 2, can execute instructions that cause the processor to perform the method 550. The method 550 can be performed as part of a universal list system and/or service.

The method 550 includes receiving a process ID from a communication device using a communication mode, at 552. More specifically, in some embodiments, a communication module (similar to the communication modules 202 and 204 shown and described with respect to FIG. 2) can receive the process ID from the communication device. Step 552 can be substantially similar to step 502, shown and described with respect to FIG. 5A.

After receiving the process ID at step 552, the host device queries a process database using the process ID, at 554. Such a process database can be structurally and functionally similar to the process database 126 and/or the process database 300 shown and described with respect to FIGS. 1 and 3, respectively. The host device determines whether the process ID is valid, at 556. For example, in some embodiments, the host determines if the process ID is stored in the process database, is available to that user (e.g., is valid in their geographic region), has not expired, and/or the like. If the process ID is not valid, the host device sends an error message to the communication device, at 558. Such an error message can be substantially similar to the error message sent at step 506 of FIG. 5A.

The host device can then determine if the user sending the process ID is registered to use that communication mode to update their universal list, at 560. Such a determination can be substantially similar to the determination in step 504 of FIG. 5A. If the host device determines that the communication identifier is associated with a user, the host device can proceed to add the items associated with the process ID to the user's universal list, at step 562, and send a confirmation to the user that the items were added to their universal list, at step 564. Steps 562 and 564 can be substantially similar to steps 514 and 516, respectively, of FIG. 5A.

If, however, the host device determines that the communication identifier is not associated with a user at 560, the host device can define a new universal list, at 566. For example, if the host device receives an instant message from a user having an IM ID of "Sid," the host device can determine that that IM ID is not yet associated with a user. Accordingly, the host device can proceed to step 566 and define a new universal list associated with the IM ID of "Sid." For example, a new record associated with the IM ID of "Sid" can be defined and/or added to a universal list database (e.g., universal list database 450 of FIG. 4B).

Similar to step 562, the host device can add the items associated with the process ID to the new universal list, at 568. The host device can then send a confirmation to the user including a link to the new list and an option to merge the new list with an existing list, at 570. Specifically, the confirmation can include a link to the new list such that a user not registered for the communication mode via which the process ID is received can access the new list including the items associated with the process ID. Similarly stated, by accessing the link in the confirmation, the user can view their newly defined list. Additionally, the confirmation can include an option to merge the new list with an existing list (e.g., a list associated with a user account). Thus, a user already associated with a universal list account with the universal list system and/or service can merge the newly defined universal list with their existing universal list. In some embodiments, the confirmation can also include an option to register for that communication mode, similar to step 506 in FIG. 5A.

While alternative methods for updating a universal list are shown and described above with respect to FIGS. 5A and 5B, in some embodiments the method and/or process used to update a universal list can be dependant on the communication mode via which a user sends a process ID to the universal list system and/or service. For example, method 500, shown and described with respect to FIG. 5A, can be used to update a universal list via a first communication mode (e.g., email) while method 550, shown and described with respect to FIG. 5B, can be used to update a universal list via a second communication mode (e.g., SMS).

Figure 6:
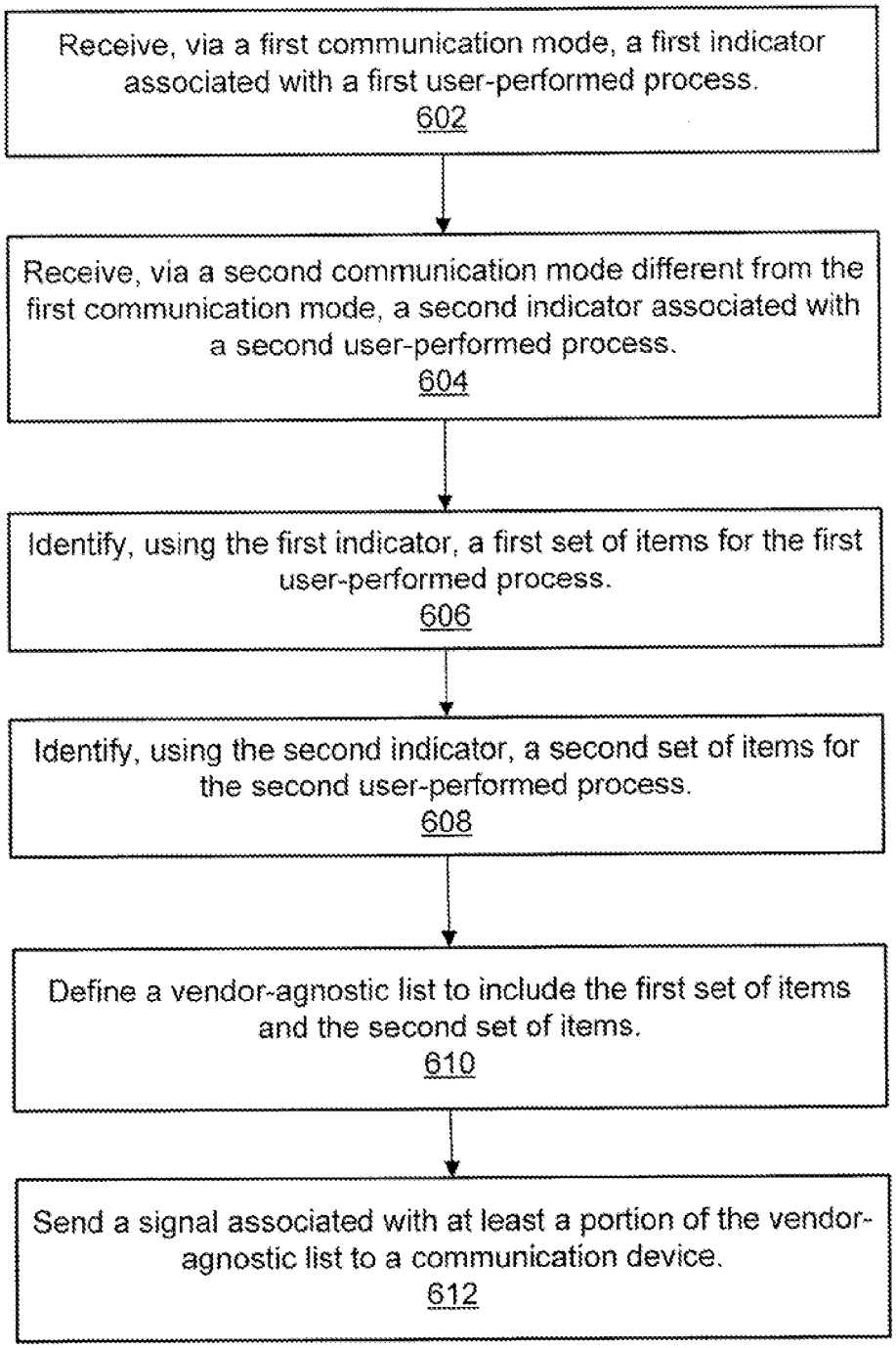

FIG. 6 is a flow chart illustrating a method 600 of updating a universal list, according to another embodiment. The method 600 includes receiving, via a first communication mode, a first indicator associated with a first user-performed process, at 602. A second indicator associated with a second user-performed process is received, via a second communication mode different from the first communication mode, at 604. As discussed above, in some embodiments, the first communication mode and the second communication mode can be any two suitable communication modes, such as, for example, email, text messaging (e.g., SMS), instant messaging, transmitting an optical pattern (e.g., scan of a barcode on a product's packaging, on an advertisement, etc.), transmitting an RF pattern, a mobile device application, via a website, using a personal computer (PC) application, an interactive advertisement (e.g., a Flash advertisement on a website), an interactive television (ITV) application (e.g., user uses their TV remote to select and/or enter process ID), TCP/IP transmissions, interactive voice response (e.g., via touch tones and/or voice recognition), and/or the like. Similarly, as discussed above, the first user-performed process and the second user-performed process can be any user-performed processes such as, for example, recipes, home improvement projects, activities, and/or the like.

A first set of items for the first user-performed process is identified using the first indicator, at 606. A second set of items for the second user-performed process is identified using the second indicator, at 608. As discussed above, in some embodiments, the first set of items and the second set of items can be associated with the first identifier and the second identifier, respectively, in a database. In some embodiments, the first set of items and the second set of items can be items used to perform the first user-performed process and the second user-performed process, respectively.

A vendor-agnostic list is defined to include the first set of items and the second set of items, at 610 and a signal associated with at least a portion of the vendor-agnostic list is sent to a communication device, at 612. In some embodiments, a user of the communication device can then view the vendor-agnostic list on a display of the communication device. Additionally, in some embodiments, the user of the communication device can use the vendor-agnostic list to shop for, locate and/or as a reminder to purchase the items on the universal list.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, a communication device can present a purchase option to a user based on items added to that user's vendor-agnostic list. For example, if a user adds the user-performed process of "painting a room" to their list (see, e.g., FIG. 3), a communication device can present an option to the user to purchase paint, tarps, paint brushes and/or paint rollers. For example, a link to one or more websites via which the items can be purchased can be presented to the user. The user can then purchase the items remotely from an online vendor using the communication device. Such items can then be delivered to the user or retrieved from a physical store associated with the online vendor at a later time. This allows a user to efficiently purchase the items used to perform a user-performed process. In some embodiments, the item can be purchased from a communication device different from the communication device from which the signal to add the item was sent.

In some embodiments, a process identifier for a user-performed process can be associated with a specific advertisement campaign. In such embodiments, for example, multiple process identifiers can be associated with a particular, single user-performed process. Each process identifier, however, can be associated with a different advertisement campaign and/or a different advertisement channel (e.g., radio, television, print medium, online, etc.). For example, a first process identifier can be associated with a television advertisement for a user-performed process, a second process identifier can be associated with a radio advertisement for the user-performed process and a third process identifier can be associated with an online advertisement for the user-performed process. Using different process identifiers for different advertisement campaigns and/or different advertisement channels allows a manufacturer or vender to track each advertisement campaign and/or channel separately and determine which advertisement campaigns and/or channels are being used most often to add the user-performed process to vendor-agnostic lists.

While shown and described above with respect to a recipe, a home improvement project or an activity, in other embodiments items used to perform any user-performed process can be added to a vendor-agnostic list. For example, a user-performed process can be hosting a birthday party and the items can include items to host the birthday party (e.g., cake, candles, paper plates, napkins, etc.). For another example, a user-performed process can include a packing for a vacation and the items can include suggested items to bring on the vacation (e.g., cloths, toothbrush, sunscreen, etc.). For yet another example, a user-performed process can include hosting a picnic and the items can include suggested items to bring on the picnic. Accordingly, a host device can add items for any user-performed process to a user's vendor-agnostic list in response to receiving a process identifier for that user-performed process.

In some embodiments, advertisements and/or coupons can be presented to a user (e.g., sent from a host device to the user's communication device) based on the items added to the user's vendor-agnostic list. For example, advertisements and/or coupons associated with items associated with a user-performed process can be presented to a communication device after the items have been added to a user's vendor-agnostic list. Accordingly, a user can be provided advertisements and/or coupons for items they intend to purchase.

In some embodiments, coupons and/or promotions can be associated with a user's vendor-agnostic list based on a vendor's loyalty program. For example, a user's vendor-agnostic list can be associated with a loyalty card program, a frequent shopper program, and/or the like. In such embodiments, a vendor can add vendor specific coupons associated with that vendor's loyalty program (e.g., based on purchases made at the vendor, deals of the week at the vendor, etc.) to the user's vendor-agnostic list. In such embodiments, the coupon can be associated with the user based on their loyalty program identifier. Thus, the user can obtain the promotion associated with the coupon upon presenting their loyalty program identifier to the vendor.

In some embodiments, attributes associated with an item can be associated with the item on the universal list. For example, a coupon associated with the item, an expiration date of a coupon or promotion associated with the item, an importance level of the item, a store or list of stores having the item, a product identifier associated with the item (e.g., a universal product code (UPC), a stock-keeping unit (SKU), a serial number, a model number, etc.), a range of product identifiers associated with the item (e.g., certain brand, product line, etc.) and/or the like can be associated with the item on the universal list. In some embodiments, such attributes can be automatically associated with the item in response to receiving an identifier associated with that item and/or a user-performed process including that item. In other embodiments, such attributes can be associated with the item by a user of the universal list. In still other embodiments, some of the attributes are automatically associated while other attributes can be added to the item by the user of the universal list.

While shown and described above as having a single universal list, in some embodiments a user can have multiple universal lists. For example, a user can have a home improvement universal list, a grocery/food universal list, and/or any other types of universal lists. As described in further detail herein, a user can also include an unshared universal list as well as one or more universal lists shared with different other users.

In some embodiments, a process ID can be used to identify multiple other process IDs. In such embodiments, for example, a process ID associated with a user-performed process can be used to identify process IDs of the items used to perform that user-performed process. Using FIG. 3 as an example, the process ID for "BBQ Chicken" (i.e., 2) can be used to identify the process IDs for "BBQ Sauce" and "Chicken Breasts" (not shown in FIG. 3). Using the process IDs, the items ("BBQ Sauce" and "Chicken Breasts") can be added to the user's universal list. Similarly, in some embodiments, a process ID can be used to identify a brand of products, a product line, and/or the like.

While shown and described above as being associated with a user-performed process or an item, in some embodiments process IDs can also be associated with actions. For example, a process ID can be associated with sharing a list, defining a new list, deleting a list, adding an alert for an item, subscribing/unsubscribing to a marketing list (e.g., to receive deals of the week, a recipe of the day, etc.), and/or the like. In some embodiments, for example, if a first user sends the process ID of "SHARE" with a list identifier and a second user's user ID, the first user's list associated with the list identifier can be shared with the second user. Similarly, for another example, to delete one of a user's lists, the user can send the process ID of "DELETE" with a list identifier of the list to be deleted.

In some embodiments, a process ID can be associated with a website, application and/or store. For example, when the user adds one or more items to their universal list (e.g., individually and/or as part of a user-performed process), the user can be redirected to a website and/or application associated with an item added. In some embodiments, for example, the user can be redirected to a manufacturer's website, a retailer's website, a social networking application and/or the like. Similarly, in some embodiments, when a user wishes to view details associated with an item on their universal list, they can select the item and/or process ID from their universal list. Such a selection can, for example, direct them to the website associated with that process ID and/or item.

In some embodiments, a third party application using an application programming interface (API) can be used by a user to interact with (e.g., view, update, add to, remove from, edit, etc.) their universal list. For example, a social networking site can use an API to access a user's universal list and to present the universal list in the social networking site. Such an API provides integration of a universal list system and/or service into other systems, programs, applications, websites, and/or the like.

In some embodiments, a vendor-agnostic list and/or another portion of a mobile device application can include instructions and/or steps to perform the user-performed process. For example, if a process identifier for the process of "painting a room" (see, e.g., FIG. 3) is sent to a host device, the instructions and/or steps for painting a room can be added to the vendor-agnostic list (and/or another portion of a mobile device application) along with the items used to paint a room. For another example, if a process identifier for the process of cooking "BBQ chicken" is sent to a host device, the instructions and/or steps for cooking BBQ chicken can be added to the vendor-agnostic list (and/or another portion of a mobile device application) along with the items used to cook BBQ chicken.

While shown and described above as each user having a different universal list, in some embodiments universal lists can be shared between users. For example, multiple users within a family (e.g., husband, wife, kids) can have access to the same universal list. This allows each individual within a group to view and/or update a common list.

In some embodiments, a user of the universal list system and/or service can define a user-performed process and provide the user-performed process to the universal list system and/or service. In such embodiments, the universal list system and/or service can assign a process ID to the user-performed process. Other users can then access the user-performed process using that process ID (e.g., shared via a blog, email, word-of-mouth, etc.). In this manner, users can share user-performed processes with other users.

While shown and described above as a user adding one or more items to a universal list by sending an identifier to a host device, in some embodiments a user can add one more items to their universal list based on a recommendation and/or suggestion made by the universal list system and/or service. For example, the universal list system and/or service can provide a recommendation to a user for a product, coupon, user-performed process, and/or the like. Such a recommendation can be sent to a communication device of the user via, for example, a text message, a mobile application, an email, an instant message, and/or the like. In some embodiments, such a recommendation can be based on, for example, a purchase history of the user, a geographic location of a user, user-defined preferences of a user, the purchase history of friends, a recommendation by a friend (e.g., connected via a social network website), an item added by another user with a similar history as the user, a time of day, a season of year, a day of week, and/or the like. A user can add the recommended product, coupon, user-performed process, and/or the like to their universal list and/or their user-performed process collection by, for example, selecting a link within the recommendation and/or replying to a message (e.g., email, SMS, instant message, etc.) associated with the recommendation.

In some embodiments, additional information associated with a user can be sent to a host device when that user sends a process ID (or other messages) to the host device. For example, an indication of a geographic location of the user can be sent to the host device with a process ID. Such a geographic location can be determined using, for example, a GPS module of a communication device and/or any other suitable method. The universal list system and/or service at the host device can use the geographic location of the communication device to authenticate a user, to provide recommended products, coupons and/or promotions to a user, to verify that a user meets requirements for a particular promotion (e.g., must be in a specific store or geographic area to redeem a coupon or participate in a promotion), and/or the like. In other embodiments, any other information (e.g., time of day, day of week, purchase history, website history, etc.) can be sent to the host device when a user sends a process ID (or other message) to the host device.

In some embodiments, a universal list can be a wish-list. In such embodiments, for example, a user can use a universal list for a bridal registry, a baby registry, a child's birthday list and/or the like. Such a wish-list can then be shared with other users such that the other users can view and/or purchase items from the wish-list.

In some embodiments, one or more alerts (e.g., email alerts, alert within an application, audio alert, tactile alert, etc.) can be configured with respect to a user's account with a universal list system and/or service. In such embodiments, for example, a user can define an alert associated with an expiration date of one or more coupons and/or promotions, an alert associated with another user adding an item to, removing an item from, and/or modifying an item on a shared list, a friend adding an item to their list, and/or the like. In some embodiments, such alerts can be defined automatically when an item is added to a universal list (e.g., the alert can be associated with a process ID). In other embodiments, such alerts can be manually defined by a user. In still other embodiments, some alerts can be defined automatically while other alerts are manually defined.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A non-transitory processor-readable medium storing code representing instructions to be executed by a processor, the code comprising code to cause the processor to:
   receive, via a first communication mode, a first process identifier associated with a first user-performed process and a first account identifier associated with an account of a user;
   receive, via a second communication mode different from the first communication mode, a second process identifier associated with a second user-performed process and a second account identifier associated with the account of the user;
   identify, using the first process identifier, a first plurality of items for the first user-performed process;
   identify, using the second process identifier, a second plurality of items for the second user-performed process;
   define a vendor-agnostic list associated with the account of the user to include the first plurality of items and the second plurality of items, based on the first account identifier and the second account identifier; and
   send a signal associated with at least a portion of the vendor-agnostic list to a communication device associated with the account of the user.

2. The non-transitory processor-readable medium of claim 1, wherein the first communication mode and the second communication mode each includes at least one of an instant message, an electronic-mail message, a text message, an optical pattern scan, a mobile device application, a personal computer application, a response to an interactive advertisement, an interactive television application response, a TCP/IP transmission, or an interactive voice response.

3. The non-transitory processor-readable medium of claim 1, wherein the first process identifier has a representation within a print medium to be viewed by the user.

4. The non-transitory processor-readable medium of claim 1, wherein the first process identifier has a representation within television viewable content to be viewed by the user.

5. The non-transitory processor-readable medium of claim 1, wherein the first process identifier has a representation within audible content to be perceived by the user.

6. The non-transitory processor-readable medium of claim 1, wherein the first user-performed process and the second user-performed process each is at least one of an activity, a recipe or a home improvement project.

7. The non-transitory processor-readable medium of claim 1, wherein the code to cause the processor to identify the first plurality of items includes code to cause the processor to query a process database using the first process identifier.

8. The non-transitory processor-readable medium of claim 1, further comprising code to cause the processor to:
store an association of the first process identifier with the account of the user in response to receiving the first process identifier.

9. The non-transitory processor-readable medium of claim 1, further comprising code to cause the processor to:
determine an identity of the user involved in the first communication mode and the second communication mode based on at least one of a telephone number of a communication device, a user name associated with an instant message account, an electronic mail address, or an identifier of the communication device.

10. The non-transitory processor-readable medium of claim 1, further comprising code to cause the processor to:
associate the first user-performed process with the account of the user such that the user can view the first user-performed process when signing into the account.

11. The non-transitory processor-readable medium of claim 1, wherein the first user-performed process is associated with a set of instructions used to perform the first user-performed process with the first plurality of items.

12. The non-transitory processor-readable medium of claim 1, wherein the first process identifier is associated with an advertisement campaign, an effectiveness of the advertising campaign to be tracked based on the first process identifier.

13. An apparatus, comprising:
a first communication module implemented in a processing device or stored in a memory and configured to be executed by a processing device, the first communication module configured to receive, from a first communication device via a first communication mode, a process identifier of a user-performed process associated with a plurality of items and a plurality of instructions used to perform the user-performed process;
a second communication module configured to receive, from a second communication device via a second communication mode different than the first communication mode, the process identifier of the user-performed process;
an item module operatively coupled to the first communication module and the second communication module, the item module configured to retrieve from a process database, based on receiving the process identifier from at least one of the first communication module or the second communication module, an identifier for each item from the plurality of items and an identifier for each instruction from the plurality of instructions used to perform the user-performed process; and
an action module operatively coupled to the item module, the item module configured to provide to the first communication device (i) a first vendor-agnostic list including the identifier for each item from the plurality of items and (ii) the identifier for each instruction from the plurality of instructions,
the action module configured to provide to the second communication device (i) a second vendor-agnostic list including the identifier for each item from the plurality of items and (ii) the identifier for each instruction from the plurality of instructions.

14. The apparatus of claim 13, wherein the first communication mode and the second communication mode each includes at least one of an instant message, an electronic-mail message, a text message, an optical pattern scan, a mobile device application, a personal computer application, a response to an interactive advertisement, an interactive television application response, a TCP/IP transmission, or an interactive voice response.

15. The apparatus of claim 13, further comprising:
a validation module configured to query a user database to retrieve an identifier of a user account based on at least one of a telephone number of the first communication device, a user name associated with an instant message account, an electronic mail address, or an identifier of the first communication device.

16. The apparatus of claim 13, wherein the plurality of items is at least one of a list of ingredients used in a recipe, a list of supplies used in a home improvement project, or a list of supplies used in an activity.

17. The apparatus of claim 13, wherein the process identifier has a representation within a print medium to be viewed by at least one of a user of the first communication device or a user of the second communication device.

18. The apparatus of claim 13, wherein the process identifier has a representation within television viewable content to be viewed by at least one of a user of the first communication device or a user of the second communication device.

19. The non-transitory processor-readable medium of claim 13, wherein the first communication module is configured to receive, via the first communication mode, a first identifier associated with an account of the user, the first vendor-agnostic list being associated with the account of the user.

20. A non-transitory processor-readable medium storing code representing instructions to be executed by a processor, the code comprising code to cause the processor to:
receive, via a plurality of communication modes, a plurality of process identifiers, each process identifier from the plurality of process identifiers being uniquely associated with a user performed process from a plurality of user-performed processes;
receive, via at least one communication mode from the plurality of communication modes, an identifier associated with an account of the user;
identify, based on the plurality of process identifiers and for each user-performed process from the plurality of user-performed processes, a set of items and a set of instructions for that user-performed process;

define, in response to the identifying, a vendor-agnostic list to include the set of items for each user-performed process from the plurality of user-performed processes; and associate the vendor-agnostic list and the set of instructions with the account of the user based on the identifier associated with the account of the user.

21. The non-transitory processor-readable medium of claim 20, wherein the plurality of communication modes includes at least two of an instant message, an electronic-mail message, a text message, an optical pattern scan, a mobile device application, a personal computer application, a response to an interactive advertisement, an interactive television application response, a TCP/IP transmission, or an interactive voice response.

22. The non-transitory processor-readable medium of claim 20, wherein the identifier associated with the account of the user is at least one of a telephone number of a communication device of the user, a user name associated with an instant message account, an electronic mail address, or an identifier of the communication device.

23. The non-transitory processor-readable medium of claim 20, wherein a first user-performed process from the plurality of user-performed processes is a recipe and a second user-performed process from the plurality of user-performed processes is a home improvement project.

24. The non-transitory processor-readable medium of claim 20, further comprising code to cause the processor to:

store an association of each process identifier from the plurality of process identifiers with the identifier associated with the account of the user in response to receiving the plurality of process identifiers.

25. The non-transitory processor-readable medium of claim 20, wherein an identifier from the plurality of the identifiers is associated with an advertisement campaign, an effectiveness of the advertising campaign to be tracked based on the identifier.

* * * * *

UNITED STATES PATENT AND TRADEMARK OFFICE
CERTIFICATE OF CORRECTION

PATENT NO.        : 8,606,655 B2                                       Page 1 of 1
APPLICATION NO.   : 13/233388
DATED             : December 10, 2013
INVENTOR(S)       : Allen et al.

It is certified that error appears in the above-identified patent and that said Letters Patent is hereby corrected as shown below:

In the Claims

Claim 20, Column 24, line 64, change "ated with an account of the user" … to "ated with an account of a user".

Claim 25, Column 26, line 15, change "claim 20, wherein an identifier from the plurality of the iden-" … to "claim 20, wherein an identifier from the plurality of process iden-".

Signed and Sealed this
Twenty-seventh Day of May, 2014

Michelle K. Lee
*Deputy Director of the United States Patent and Trademark Office*

Disclaimer

8,606,655 B2 - Geoffrey Benjamin Allen, Potomac Falls, VA (US); Steven Lee Geyer, Herndon, VA (US); Bradley Spector Herrup, Arlington, VA (US); Rodney Dale McElrath, Raleigh, NC (US); Timothy Scott Ramsey, Chantilly, VA, (US). METHODS AND APPRATUS FOR MANAGING A UNIVERSAL LIST SYSTEM. Patent dated December 10, 2013. Disclaimer filed June 8, 2021, by the assignee Ziplist, Inc.

I hereby disclaim the following complete claims 1-25 of said patent.

*(Official Gazette, March 29, 2022)*